United States Patent
Dietzen et al.

(10) Patent No.: US 6,420,442 B1
(45) Date of Patent: Jul. 16, 2002

(54) FLAME-PROOFED POLYSTYRENE FOAMED MATERIALS

(75) Inventors: Franz-Josef Dietzen, Ludwigshafen; Guiscard Glück, Mainz; Gerd Ehrmann, Deidesheim; Gerhard Turznik, Grünstadt; Gerhard Alicke, Worms; Klaus Hahn, Kirchheim; Martin Klatt, Mannheim; Karlheinz Braun, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/856,485

(22) PCT Filed: Dec. 7, 1999

(86) PCT No.: PCT/EP99/09555

§ 371 (c)(1), (2), (4) Date: Jun. 11, 2001

(87) PCT Pub. No.: WO00/34367

PCT Pub. Date: Jun. 15, 2000

(30) Foreign Application Priority Data

Dec. 9, 1998 (DE) .......................................... 198 56 759

(51) Int. Cl.$^7$ ................................ C08J 9/04; C08J 9/12
(52) U.S. Cl. ............................. 521/82; 521/79; 521/94; 521/85; 521/146; 521/907
(58) Field of Search ............................. 521/82, 79, 94, 521/85, 146, 907

(56) References Cited

U.S. PATENT DOCUMENTS 3,574,644 A * 4/1971 Olstowski et al. ............. 106/15
5,719,199 A * 2/1998 Wallace et al. ................ 521/82

FOREIGN PATENT DOCUMENTS

| | | |
|---|---|---|
| DE | 195 31 489 | 2/1997 |
| EP | 0 729 999 | 9/1996 |
| EP | 0 863 175 | 9/1998 |

* cited by examiner

Primary Examiner—Morton Foelak
(74) Attorney, Agent, or Firm—Oblon, Spivak, McClelland, Maier & Neustadt, P.C.

(57) ABSTRACT

Flame-retardant foam slabs are based on styrene polymers wherein from 1 to 12% by weight of expanded graphite and also, if desired, from 1 to 12% by weight of a phosphorus compound are present as flame retardants.

15 Claims, No Drawings

FLAME-PROOFED POLYSTYRENE FOAMED MATERIALS

BACKGROUND OF THE INVENTION

1. Field of the Invention

The invention relates to extruded foam slabs with a density of from 20 to 200 g/l and with a cross-sectional area of at least 50 cm$^2$, and based on styrene polymers equipped with halogen-free flame retardants.

2. Description of the Background

Extruded polystyrene foams (XPS) are widely used to insulate buildings and components of buildings. For this application they have to be flame-retardant. The flame retardants usually used to render extruded polystyrene foams flame-retardant comprise halogens. For environmental reasons the use of halogens in flame retardants should be avoided.

SUMMARY OF THE INVENTION

It is an object of the present invention to provide extruded polystyrene foams which achieve the fire classification B2 required for building industry applications and which have been produced without the use of halogen-containing flame retardants.

DETAILED DESCRIPTION OF THE PREFERRED EMBODIMENTS

We have found that this object is achieved by using, as flame retardant, from 1 to 12% by weight, preferably from 3 to 8% by weight, of expanded graphite, if desired together with from 1 to 12% by weight, preferably from 3 to 8% by weight, of a phosphorus compound, based in each case on the styrene polymer.

The literature describes expanded graphite in combination with red phosphorus and/or with phosphorus-containing compounds as a flame retardant for compact polystyrene. In previous experiments, however, it has been found that halogen-free flame retardants which can be used for compact polystyrene cannot be used for foam production, since there is either severe adverse effect on the foaming process or an excessive reduction in the heat resistance of the foam. Surprisingly, however, this is not the case in the present invention.

U.S. Pat. No. 3,574,644 describes the addition of expanded graphite as flame retardant for combustible materials, inter alia for foams in which the amount of the expanded graphite to be present is from 20 to 40% by weight. The expanded graphite may either be incorporated into the expandable material prior to the expansion process or may be used to coat the expandable material after the expansion process. There is no description of XPS slabs with from 1 to 12% by weight of expanded graphite.

JP-A 03-167 263 describes a polystyrene foam which comprises, as flame retardant, expanded graphite whose surface was completely coated with a film-forming resin. This coating is described as necessary to avoid corrosion of processing machinery by the acids always present in the expanded graphite, but it requires an additional and complicated operation. Besides the expanded graphite, the polystyrene foam may also comprise conventional flame retardants, e.g. halogenated organic phosphates. The polystyrene foam is preferably prepared by mixing polystyrene foam beads with an adhesion promoter and with the coated expanded graphite. It may also be obtained by extruding a mixture of polystyrene with a blowing agent and with the coated expanded graphite. Surprisingly, it has been found that coating of the expanded graphite with a resin film is not required for XPS slabs in which from 1 to 12% of expanded graphite is present as flame retardant.

The layered lattice structure of graphite permits it to form a specific type of intercalation compound. In these compounds, which are known as interstitial compounds, foreign atoms or foreign molecules have been absorbed into the spaces between the carbon atoms, sometimes in stoichiometric ratios. These graphite compounds, e.g. with sulfuric acid as the foreign molecule, are also produced on an industrial scale and are termed expanded graphite. The density of this expanded graphite is from 1.5 to 2.1 g/cm$^3$, and its average particle size is from 20 to 2000 $\mu$m, in particular from 30 to 1000 $\mu$m.

Phosphorus compounds which may be used are halogen-free inorganic or organic phosphates, phosphites or phosphonates, and also red phosphorus. Examples of preferred phosphorus compounds are triphenyl phosphate, diphenyl cresyl phosphate, ammonium polyphosphate, melamine phosphate, resorcinol diphenyl phosphate and dimethyl methylphosphonate.

The novel foam slabs are produced by extruding and foaming a mixture made from the styrene polymer, from 3 to 15% by weight of a volatile blowing agent and from 1 to 12% by weight of expanded graphite, and also, if desired, from 1 to 12% by weight of a phosphorus compound, at above the melting point of the styrene polymer. The ratio of weights of expanded graphite and phosphorus compound is preferably from 20:80 to 80:20.

For the purposes of this invention, styrene polymers are polystyrene and styrene copolymers incorporating at least 80% by weight of styrene. Examples of possible comonomers are $\alpha$-methylstyrene, ring-halogenated styrenes, ring-alkylated styrenes, acrylonitrile, (meth)acrylates of alcohols having from 1 to 8 carbon atoms, N-vinyl compounds, such as vinylcarbazole, maleic anhydride, or else small amounts of compounds which contain two polymerizable double bonds, for example butadiene, divinylbenzene or butanediol diacrylate. The styrene polymers may comprise from 1 to 20%, based on their weight, of other thermoplastic polymers, e.g. polyacrylates or polyacrylonitrile, or also diene rubbers.

Blowing agents which may be used are the usual volatile organic compounds, such as fluorochlorohydrocarbons, fluorohydrocarbons, hydrocarbons, alcohols, ketones and ethers. However, preference is given to halogen-free blowing agents and blowing agent mixtures, e.g. inorganic gases, such as carbon dioxide, nitrogen, argon or ammonia, if desired mixed with alcohols, hydrocarbons or ethers.

Preferred blowing agent mixtures are therefore:
a) from 1 to 100% by weight of carbon dioxide,
b) up to 95% by weight of an ether selected from the class consisting of dimethyl ether, methyl ethyl ether and methyl vinyl ether,
c) up to 60% by weight of an alcohol or ketone with a boiling point of from 56 to 100° C., and
d) up to 30% by weight of an aliphatic $C_3$–$C_6$ hydrocarbon.

Particularly preferred blowing agent mixtures are composed of:
a) from 20 to 90% by weight of carbon dioxide,
b) from 1 to 30% by weight of dimethyl ether,
c) from 0 to 60% by weight of ethanol, and
d) up to 10% by weight of an aliphatic $C_3$–$C_6$ hydrocarbon, or of:

a) from 20 to 95% by weight of carbon dioxide,
c) from 80 to 5% by weight of ethanol, and
d) from 0 to 10% by weight of an aliphatic $C_3$–$C_6$ hydrocarbon.

Carbon dioxide may also be used on its own.

The amount of blowing agent used, based on the styrene polymer, is from 3 to 15% by weight, preferably from 4 to 12% by weight.

Other conventional additives and/or auxiliaries which may be used in the thermoplastic matrix are antistats, stabilizers, dyes, fillers, rathermanous particles, such as carbon black, graphite or metal powders, and/or nucleating agents, in the usual amounts.

All parts and percentages in the following examples are by weight:

A mixture made from 100 parts of polystyrene and the parts of flame retardants given in the table was fed continuously to an extruder with an internal screw diameter of 53 mm, and melted. A blowing agent mixture of 3.5 parts of $C_{O2}$ and 2.1 parts of ethanol was injected continuously into the extruder via an inlet aperture, and mixed into the melt. The homogeneously kneaded melt-blowing-agent mixture in the extruder was then introduced to a second extruder with a screw diameter of 90 mm and cooled there for a residence time of about 10 min to the temperature required for the foaming process. This cooled melt was then extruded into the atmosphere through a slot die of width 70 mm. The resultant foam was shaped by tooling to give slabs of thickness 30 mm and width 150 mm. The foam sections obtained were of the closed-cell type, and uniform and dimensionally stable.

The B2 combustibility of the resultant foam slabs was determined to DIN 4102.

The results are given in the table.

TABLE

| Example | Expanded graphite | Red phosphorus | TPP | B2 | Self-extinguishing |
|---|---|---|---|---|---|
| 1 | — | — | 10 | no | no |
| 2 | — | 10 | — | no | no |
| 3 | 8 | — | — | yes | no |
| 4 | 6 | 4 | 1.5 | yes | yes |
| 5 | 6 | 6 | — | yes | yes |
| 6 | 6 | — | 6 | yes | yes |

TPP—Triphenyl Phosphate

The expanded graphite used was CALLOTEK 600 from Kropfmühl AG.

We claim:

1. An extruded foam slab having a density of from 20 to 200 g/l and having a cross-sectional area of at least 50 cm$^2$, based on styrene polymers, wherein from 1 to 12% by weight, based on the styrene polymers, of expandable graphite, having no surface coating, is present as a flame retardant.

2. The foam slab of claim 1, which further comprises from 1 to 12% by weight, based on the styrene polymers, of a halogen-free phosphorus compound.

3. The foam slab of claim 2, wherein the halogen-free phosphorus compound is red phosphorus, or an organic or an inorganic phosphate, phosphite or phosphonate.

4. The foam slab of claim 2, wherein the halogen-free phosphorus compound is triphenyl phosphate, diphenyl cresyl phosphate, melamine phosphate, ammonium polyphosphate or diphenyl phosphate.

5. The foam slab of claim 1, wherein the expandable graphite has a density of from 1.5 to 2.1 g/cm$^3$ and an average particle size (longest diameter) of from 20 to 2000 μm.

6. The foam slab of claim 1, wherein said expandable graphite is present in an amount of from 3 to 8% by weight.

7. The foam slab of claim 5, wherein the expandable graphite has an average particle size of from 30 to 1000 μm.

8. The foam slab of claim 1, wherein said styrene polymers comprise polystyrene or styrene polymers containing at least 80% by weight of styrene.

9. The foam slab of claim 1, which meets fire classification B2 for building industry applications.

10. A process for producing the extruded foam slab of claim 1, which comprises the steps of:

a) extruding and foaming a mixture made from styrene polymers, from 3 to 15% by weight of a volatile blowing agent and from 1 to 12% by weight of expandable graphite and optionally from 1 to 12% by weight of a phosphorus compound, based, in each case, on the styrene polymers, at above the melting point of the styrene polymer.

11. The process of claim 10, wherein a halogen-free blowing agent is used.

12. The process of claim 10, wherein a weight ratio of expandable graphite and phosphorus compound of from about 20:80 to 80:20 is used.

13. The process of claim 11, wherein said halogen-free blowing agent is an organic compound which comprises volatile hydrocarbons, fluorohydrocarbon, alcohols, ketones or ethers.

14. The process of claim 11, wherein said halogen-free blowing agent is an inorganic gas comprising carbon dioxide, nitrogen, argon or ammonia.

15. The process of claim 11, wherein said halogen-free blowing agent is used in an amount of from 3 to 15% by weight based on the styrene polymers.

* * * * *